US011145864B2

(12) United States Patent
Matsumura

(10) Patent No.: US 11,145,864 B2
(45) Date of Patent: Oct. 12, 2021

(54) BINDER COMPOSITION FOR NON-AQUEOUS SECONDARY BATTERY ELECTRODE, CONDUCTIVE MATERIAL PASTE COMPOSITION FOR NON-AQUEOUS SECONDARY BATTERY ELECTRODE, SLURRY COMPOSITION FOR NON-AQUEOUS SECONDARY BATTERY ELECTRODE, ELECTRODE FOR NON-AQUEOUS SECONDARY BATTERY, AND NON-AQUEOUS SECONDARY BATTERY

(71) Applicant: ZEON CORPORATION, Tokyo (JP)

(72) Inventor: Taku Matsumura, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 16/079,680

(22) PCT Filed: Jan. 31, 2017

(86) PCT No.: PCT/JP2017/003421
§ 371 (c)(1),
(2) Date: Aug. 24, 2018

(87) PCT Pub. No.: WO2017/150048
PCT Pub. Date: Sep. 8, 2017

(65) Prior Publication Data
US 2019/0058194 A1 Feb. 21, 2019

(30) Foreign Application Priority Data

Mar. 3, 2016 (JP) .............................. JP2016-041467

(51) Int. Cl.
H01M 4/13 (2010.01)
H01M 4/62 (2006.01)
H01M 10/0566 (2010.01)
H01G 11/38 (2013.01)
H01G 11/50 (2013.01)
H01G 11/46 (2013.01)
C08L 33/08 (2006.01)
C08L 33/10 (2006.01)
C08L 33/20 (2006.01)
H01M 4/131 (2010.01)
H01M 4/58 (2010.01)

(52) U.S. Cl.
CPC ............ H01M 4/622 (2013.01); C08L 33/08 (2013.01); C08L 33/10 (2013.01); C08L 33/20 (2013.01); H01G 11/38 (2013.01); H01G 11/46 (2013.01); H01G 11/50 (2013.01); H01M 4/13 (2013.01); H01M 4/62 (2013.01); H01M 10/0566 (2013.01); C08L 2203/20 (2013.01); H01M 4/131 (2013.01); H01M 4/5825 (2013.01)

(58) Field of Classification Search
CPC .... H01M 4/622; H01M 4/131; H01M 4/5825; H01M 10/0566; C08L 33/08; C08L 33/10; C08L 33/20; C08L 2203/20
See application file for complete search history.

(56) References Cited

U.S. PATENT DOCUMENTS

| 2004/0048154 A1* | 3/2004 | Jung ..................... H01M 4/136 429/212 |
| 2004/0162378 A1* | 8/2004 | Goebel ................ C09D 167/00 524/442 |
| 2012/0095131 A1 | 4/2012 | Kinoshita et al. |
| 2013/0330622 A1 | 12/2013 | Sasaki et al. |
| 2014/0121329 A1 | 5/2014 | Araki et al. |
| 2014/0154562 A1 | 6/2014 | Fukuchi |
| 2015/0050554 A1 | 2/2015 | Fukumine et al. |
| 2015/0132643 A1* | 5/2015 | Sasaki ................... H01M 4/134 429/217 |
| 2015/0353746 A1* | 12/2015 | Tanaka ............... C08G 18/6607 428/195.1 |
| 2016/0126553 A1* | 5/2016 | Murase .................. H01M 4/13 429/217 |
| 2016/0251570 A1* | 9/2016 | Hook ..................... C09K 8/805 507/225 |
| 2017/0081434 A1* | 3/2017 | La Fleur .................. C08F 6/16 |

FOREIGN PATENT DOCUMENTS

| CN | 103326027 A | 9/2013 |
| JP | 2004103548 A | 4/2004 |
| JP | 2008166058 A | 7/2008 |
| JP | 2011076910 A | 4/2011 |
| JP | 2013008485 A | 1/2013 |
| JP | 2014110234 A | 6/2014 |
| WO | 2010114119 A1 | 10/2010 |

(Continued)

OTHER PUBLICATIONS

Mar. 21, 2017, International Search Report issued in the International Patent Application No. PCT/JP2017/003421.
Jul. 23, 2019, the Extended European Search Report issued by the European Patent Office in the corresponding European Patent Application No. 17759519.6.
Sep. 4, 2018, International Preliminary Report on Patentability issued in the International Patent Application No. PCT/JP2017/003421.
Apr. 14, 2020, Communication pursuant to Article 94(3) EPC issued by the European Patent Office in the corresponding European Patent Application No. 17759519.6.

Primary Examiner — Raymond Alejandro
(74) Attorney, Agent, or Firm — Kenja IP Law PC

(57) ABSTRACT

Provided is a binder composition for a non-aqueous secondary battery electrode that has excellent viscosity stability and can form an electrode mixed material layer having excellent electrolyte solution resistance. The binder composition for a non-aqueous secondary battery electrode contains a polymer including a functional group that is bondable with a cationic group and an organic compound including at least two cationic groups.

14 Claims, No Drawings

(56) References Cited

FOREIGN PATENT DOCUMENTS

| WO | 2012115096 A1 | 8/2012 |
| WO | 2012165120 A1 | 12/2012 |
| WO | 2013080989 A1 | 6/2013 |

* cited by examiner

BINDER COMPOSITION FOR NON-AQUEOUS SECONDARY BATTERY ELECTRODE, CONDUCTIVE MATERIAL PASTE COMPOSITION FOR NON-AQUEOUS SECONDARY BATTERY ELECTRODE, SLURRY COMPOSITION FOR NON-AQUEOUS SECONDARY BATTERY ELECTRODE, ELECTRODE FOR NON-AQUEOUS SECONDARY BATTERY, AND NON-AQUEOUS SECONDARY BATTERY

TECHNICAL FIELD

The present disclosure relates to a binder composition for a non-aqueous secondary battery electrode, a conductive material paste composition for a non-aqueous secondary battery electrode, a slurry composition for a non-aqueous secondary battery electrode, an electrode for a non-aqueous secondary battery, and a method of producing a non-aqueous secondary battery.

BACKGROUND

Non-aqueous secondary batteries (hereinafter, also abbreviated as "secondary batteries") such as lithium ion secondary batteries have characteristics such as compact size, light weight, high energy density, and the ability to be repeatedly charged and discharged, and are used in a wide variety of applications. Consequently, studies have been made to improve battery members such as electrodes in recent years for the purpose of achieving even higher non-aqueous secondary battery performance.

An electrode used in a secondary battery, such as a lithium ion secondary battery, normally includes a current collector and an electrode mixed material layer (positive electrode mixed material layer or negative electrode mixed material layer) formed on the current collector. The electrode mixed material layer is formed, for example, through application and drying on the current collector of a slurry composition containing an electrode active material, a binder-containing binder composition, and so forth.

In recent years, attempts have been made to improve binder compositions used in formation of electrode mixed material layers in order to achieve further improvement of secondary battery performance.

In one specific example, PTL 1 reports that a binder composition containing: a non-crosslinked polymer including a functional group that is bondable with a polyvalent metal ion; and a polyvalent metal compound including a polyvalent metal and a ligand having a molecular weight of 30 or more has excellent viscosity stability, and that through use of this binder composition, it is possible to increase close adherence of an electrode mixed material layer and a current collector and improve cycle characteristics of a secondary battery.

CITATION LIST

Patent Literature

PTL 1: JP 2008-166058 A

SUMMARY

Technical Problem

However, the viscosity stability of the conventional binder composition described above still cannot be considered sufficiently satisfactory. Moreover, a problem exists in terms that an electrode mixed material layer obtained using the conventional binder composition easily elutes into electrolyte solution, and secondary battery high-temperature storage characteristics deteriorate. In other words, there is room for improvement over the conventional binder composition in terms of increasing electrolyte solution resistance of an electrode mixed material layer and improving high-temperature storage characteristics of a secondary battery while ensuring viscosity stability.

Accordingly, an objective of the present disclosure is to provide a binder composition for a non-aqueous secondary battery electrode that has excellent viscosity stability and can form an electrode mixed material layer having excellent electrolyte solution resistance.

Another objective of the present disclosure is to provide a conductive material paste composition for a non-aqueous secondary battery electrode and a slurry composition for a non-aqueous secondary battery electrode that can form an electrode mixed material layer having excellent electrolyte solution resistance and can cause a non-aqueous secondary battery to display excellent high-temperature storage characteristics.

Yet another objective of the present disclosure is to provide an electrode for a non-aqueous secondary battery that includes an electrode mixed material layer having excellent electrolyte solution resistance and can cause a non-aqueous secondary battery to display excellent high-temperature storage characteristics.

The present disclosure also has an objective of providing a non-aqueous secondary battery having excellent high-temperature storage characteristics.

Solution to Problem

The inventor conducted diligent investigation with the aim of solving the problems set forth above. Through this investigation, the inventor discovered that a binder composition containing a polymer including a functional group that is bondable with a cationic group and an organic compound including at least two cationic groups has excellent viscosity stability and that an electrode mixed material layer for which elution into electrolyte solution is inhibited can be formed using this binder composition, and thereby completed the present disclosure.

Specifically, the present disclosure aims to advantageously solve the problems set forth above by disclosing a binder composition for a non-aqueous secondary battery electrode comprising: a polymer including a functional group that is bondable with a cationic group; and an organic compound including at least two cationic groups. A binder composition that contains a polymer including a functional group that is bondable with a cationic group and an organic compound including at least two cationic groups as set forth above has excellent viscosity stability and can form an electrode mixed material layer having excellent electrolyte solution resistance.

Herein, the term "cationic group" refers to a functional group that can hold a positive charge when present alone or with a substance that supplies positive electrical charge in a solvent. Moreover, the "functional group that is bondable with a cationic group" referred to herein is a functional group that can interact with a cationic group by ionic bonding, hydrogen bonding, covalent bonding, or the like in a solvent.

In the presently disclosed binder composition for a non-aqueous secondary battery electrode, the functional group that is bondable with a cationic group is preferably at least one selected from the group consisting of a carboxylic acid group, a sulfonate group, a phosphate group, and a hydroxyl group. Through use of a polymer that includes any of the specific functional groups set forth above, electrolyte solution resistance of an electrode mixed material layer can be further improved while ensuring viscosity stability of the binder composition.

In the presently disclosed binder composition for a non-aqueous secondary battery electrode, the polymer preferably includes at least 0.1 mass % and not more than 20 mass % of a monomer unit including a functional group that is bondable with a cationic group. Through use of a polymer that includes a monomer unit including a functional group that is bondable with a cationic group in an amount within the range set forth above, electrolyte solution resistance of an electrode mixed material layer can be further improved while ensuring viscosity stability of the binder composition.

The presently disclosed binder composition for a non-aqueous secondary battery electrode preferably comprises at least 0.1 parts by mass and not more than 20 parts by mass of the organic compound per 100 parts by mass of the polymer. When the amount of the organic compound including at least two cationic groups is within the range set forth above, electrolyte solution resistance of an electrode mixed material layer can be further improved while ensuring viscosity stability of the binder composition. Moreover, peel strength of an electrode (close adherence strength of an electrode mixed material layer and a current collector) can be ensured.

In the presently disclosed binder composition for a non-aqueous secondary battery electrode, a cationic group in the organic compound is preferably a substituted or unsubstituted amino group. Through use of an organic compound that includes at least two substituted or unsubstituted amino groups as cationic groups, electrolyte solution resistance of an electrode mixed material layer can be further improved while ensuring viscosity stability of the binder composition.

In the presently disclosed binder composition for a non-aqueous secondary battery electrode, the organic compound preferably has a molecular weight of at least 300 and not more than 400,000. Through use of an organic compound that has a molecular weight within the range set forth above, electrolyte solution resistance of an electrode mixed material layer can be further improved while ensuring viscosity stability of the binder composition.

Moreover, the present disclosure aims to advantageously solve the problems set forth above by disclosing a conductive material paste composition for a non-aqueous secondary battery electrode comprising: a conductive material; and any of the binder compositions for a non-aqueous secondary battery electrode set forth above. By producing a conductive material paste composition containing a conductive material and any of the binder compositions set forth above, and then producing a slurry composition by adding an electrode active material and the like to this conductive material paste composition, an electrode mixed material layer having excellent electrolyte solution resistance can be formed, and a secondary battery can be caused to display excellent high-temperature storage characteristics.

Also, the present disclosure aims to advantageously solve the problems set forth above by disclosing a slurry composition for a non-aqueous secondary battery electrode comprising: an electrode active material; and any of the binder compositions for a non-aqueous secondary battery electrode set forth above. Through use of a slurry composition that contains an electrode active material and any of the binder compositions set forth above in this manner, an electrode mixed material layer having excellent electrolyte solution resistance can be formed, and a secondary battery can be caused to display excellent high-temperature storage characteristics.

Furthermore, the present disclosure aims to advantageously solve the problems set forth above by disclosing an electrode for a non-aqueous secondary battery comprising an electrode mixed material layer formed using the slurry composition for a non-aqueous secondary battery electrode set forth above. An electrode mixed material layer obtained using the slurry composition set forth above in this manner has excellent electrolyte solution resistance, and an electrode including this electrode mixed material layer can cause a secondary battery to display excellent high-temperature storage characteristics.

Moreover, the present disclosure aims to advantageously solve the problems set forth above by disclosing a non-aqueous secondary battery comprising a positive electrode, a negative electrode, an electrolyte solution, and a separator, wherein at least one of the positive electrode and the negative electrode is the electrode for a non-aqueous secondary battery set forth above. A non-aqueous secondary battery that includes the electrode set forth above in this manner has excellent high-temperature storage characteristics.

Advantageous Effect

According to the present disclosure, it is possible to obtain a binder composition for a non-aqueous secondary battery electrode that has excellent viscosity stability and can form an electrode mixed material layer having excellent electrolyte solution resistance.

Moreover, according to the present disclosure, it is possible to obtain a conductive material paste composition for a non-aqueous secondary battery electrode and a slurry composition for a non-aqueous secondary battery electrode that can form an electrode mixed material layer having excellent electrolyte solution resistance and can cause a non-aqueous secondary battery to display excellent high-temperature storage characteristics.

Furthermore, according to the present disclosure, it is possible to obtain an electrode for a non-aqueous secondary battery that includes an electrode mixed material layer having excellent electrolyte solution resistance and can cause a non-aqueous secondary battery to display excellent high-temperature storage characteristics.

Also, according to the present disclosure, it is possible to obtain a non-aqueous secondary battery having excellent high-temperature storage characteristics.

DETAILED DESCRIPTION

The following provides a detailed description of embodiments of the present disclosure.

A presently disclosed binder composition for a non-aqueous secondary battery electrode can be used in production of a slurry composition for a non-aqueous secondary battery electrode. Moreover, the presently disclosed binder composition for a non-aqueous secondary battery electrode can be used in production of a slurry composition for a non-aqueous secondary battery electrode after being mixed with a conductive material to obtain a conductive material paste composition for a non-aqueous secondary battery electrode containing the binder composition for a non-aqueous secondary battery electrode and the conductive material. Furthermore, a slurry composition for a non-aqueous secondary battery electrode produced using the presently disclosed binder composition for a non-aqueous secondary battery electrode can be used in formation of an electrode of a non-aqueous secondary battery such as a lithium ion secondary battery. Also, a feature of a presently disclosed non-aqueous secondary battery is that an electrode for a non-aqueous secondary battery formed using a presently disclosed slurry composition for a non-aqueous secondary battery electrode is used therein.

Note that the presently disclosed binder composition for a non-aqueous secondary battery electrode, conductive material paste composition for a non-aqueous secondary battery electrode, and slurry composition for a non-aqueous secondary battery electrode are particularly suitable for use in formation of a positive electrode of a non-aqueous secondary battery.

(Binder Composition for Non-Aqueous Secondary Battery Electrode)

The presently disclosed binder composition for a non-aqueous secondary battery electrode contains a polymer including a functional group that is bondable with a cationic group (hereinafter, also referred to as "polymer (A)") and an organic compound including at least two cationic groups (hereinafter, also referred to as "polyvalent cationic organic compound (B)"), and may optionally further contain other components that can be compounded in secondary battery electrodes. Moreover, the presently disclosed binder composition for a non-aqueous secondary battery electrode normally further contains a solvent such as an organic solvent.

Through inclusion of the polymer including a functional group that is bondable with a cationic group and the organic compound including at least two cationic groups, the presently disclosed binder composition displays little change in viscosity even upon long-term storage and can improve electrolyte solution resistance of an electrode mixed material layer.

Although it is not clear why the presently disclosed binder composition has excellent viscosity stability and can improve electrolyte solution resistance of an electrode mixed material layer, the reason is presumed to be as follows. Specifically, the functional group of the polymer (A) and the cationic groups of the polyvalent cationic organic compound (B) can favorably interact in the solvent in the presently disclosed binder composition so as to inhibit change in viscosity over time compared to, for example, a case in which the polymer (A) is used in combination with the specific ligand-containing polyvalent metal compound described in PTL 1. Moreover, as a result of the presently disclosed binder composition containing the polymer (A) and the polyvalent cationic organic compound (B), the functional group of the polymer (A) and the cationic groups of the polyvalent cationic organic compound (B) interact even more strongly by crosslinking or the like when an electrode mixed material layer is formed through drying or the like of a slurry composition that contains the binder composition. This strong interaction can form a rigid network and inhibit elution into electrolyte solution of components contained in the electrode mixed material layer. Consequently, it is possible to improve electrolyte solution resistance of an electrode mixed material layer and cause a secondary battery to display excellent high-temperature storage characteristics while ensuring viscosity stability of the binder composition through the present disclosure.

<Polymer Including Functional Group Bondable with Cationic Group>

In an electrode produced by forming an electrode mixed material layer on a current collector using a slurry composition for a non-aqueous secondary battery electrode that is produced using the binder composition, the polymer including a functional group that is bondable with a cationic group holds components contained in the electrode mixed material layer so that these components do not become detached from the electrode mixed material layer (i.e., is an adhesive polymer that functions as a binder).

[Functional Group Bondable with Cationic Group]

Examples of the functional group in the polymer (A) that is bondable with a cationic group (hereinafter, also referred to as a "bondable functional group") include, but are not specifically limited to, a carboxylic acid group, a sulfonate group, a phosphate group, and a hydroxyl group that can favorably interact with a cationic group. Of these groups, a carboxylic acid group, a sulfonate group, and a phosphate group are more preferable, and a carboxylic acid group is particularly preferable. Through use of the polymer (A) including any of such functional groups, electrolyte solution resistance of an electrode mixed material layer and high-temperature storage characteristics of a secondary battery can be further improved while ensuring viscosity stability of the binder composition. It should be noted that the polymer (A) may include one type of bondable functional group, or may include two or more types of bondable functional groups.

[Make-Up of Polymer (A)]

The polymer (A) may be any polymer that includes a monomer unit including a functional group that is bondable with a cationic group (hereinafter, a "monomer including a functional group that is bondable with a cationic group" may also be referred to as a "bondable functional group-containing monomer" and "a monomer unit including a functional group that is bondable with a cationic group" may also be referred to as a "bondable functional group-containing monomer unit"). Specifically, the polymer may be a polymer that includes a bondable functional group-containing monomer unit and optionally includes repeating units other than the bondable functional group-containing monomer unit.

[[Bondable Functional Group-Containing Monomer Unit]]

Suitable examples of bondable functional group-containing monomers that may be used to form the bondable functional group-containing monomer unit include carboxylic acid group-containing monomers, sulfonate group-containing monomers, phosphate group-containing monomers, and hydroxyl group-containing monomers.

Examples of carboxylic acid group-containing monomers include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of monocarboxylic acid derivatives include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of dicarboxylic acids include maleic acid, fumaric acid, and itaconic acid.

Examples of dicarboxylic acid derivatives include methylmaleic acid, dimethylmaleic acid, phenylmaleic acid, chloromaleic acid, dichloromaleic acid, fluoromaleic acid, and maleic acid monoesters such as nonyl maleate, decyl maleate, dodecyl maleate, octadecyl maleate, and fluoroalkyl maleate.

Examples of acid anhydrides of dicarboxylic acids include maleic anhydride, acrylic anhydride, methylmaleic anhydride, and dimethylmaleic anhydride.

Furthermore, an acid anhydride that produces a carboxyl group upon hydrolysis can also be used as a carboxylic acid group-containing monomer.

Examples of sulfonate group-containing monomers include vinyl sulfonic acid, methyl vinyl sulfonic acid, (meth)allyl sulfonic acid, 3-allyloxy-2-hydroxypropanesulfonic acid, and 2-acrylamido-2-methylpropanesulfonic acid.

In the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In the present disclosure, "(meth)acryloyl" is used to indicate "acryloyl" and/or "methacryloyl".

Examples of hydroxyl group-containing monomers include ethylenically unsaturated alcohols such as (meth)allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of (meth)acrylic acid and polyalkylene glycol represented by a general formula $CH_2=CR^Z-COO-(C_nH_{2n}O)_m-H$ (where m represents an integer of 2 to 9, n represents an integer of 2 to 4, and $R^Z$ represents hydrogen or a methyl group); mono(meth)acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; and (meth)allyl thioethers of alkylene glycols such as (meth)allyl-2-hydroxyethyl thioether and (meth)allyl-2-hydroxypropyl thioether.

In the present disclosure, "(meth)acryl" is used to indicate "acryl" and/or "methacryl".

Of these bondable functional group-containing monomers, carboxylic acid group-containing monomers, sulfonate group-containing monomers, and phosphate group-containing monomers are preferable, and carboxylic acid group-containing monomers are more preferable from a viewpoint of causing favorable interaction of the polymer (A) with the polyvalent cationic organic compound (B), and further improving electrolyte solution resistance of an electrode mixed material layer and high-temperature storage characteristics of a secondary battery while ensuring viscosity stability of the binder composition. In other words, the bondable functional group-containing monomer unit is preferably at least one selected from the group consisting of a carboxylic acid group-containing monomer unit, a sulfonate group-containing monomer unit, and a phosphate group-containing monomer unit, and is more preferably a carboxylic acid group-containing monomer unit.

Moreover, one bondable functional group-containing monomer may be used individually, or two or more bondable functional group-containing monomers may be used in combination in a freely selected ratio.

The proportion in which the bondable functional group-containing monomer unit is included in the polymer (A) is preferably 0.1 mass % or more, more preferably 0.2 mass % or more, and even more preferably 0.5 mass % or more, and is preferably 20 mass % or less, more preferably 10 mass % or less, and even more preferably 5 mass % or less. When the proportion in which the bondable functional group-containing monomer unit is included in the polymer (A) is not more than any of the upper limits set forth above, interaction of the polymer (A) with the polyvalent cationic organic compound (B) is not excessive, and thus aggregation of these components can be inhibited, and viscosity stability of the binder composition can be ensured. Moreover, when the proportion in which the bondable functional group-containing monomer unit is included in the polymer (A) is at least any of the lower limits set forth above, electrolyte solution resistance of an electrode mixed material layer can be further improved while ensuring viscosity stability of the binder composition, and a secondary battery having excellent high-temperature storage characteristics can be obtained.

[[Repeating Units Other than Bondable Functional Group-Containing Monomer Unit]]

Examples of repeating units other than the bondable functional group-containing monomer unit that may be included in the polymer (A) include, but are not specifically limited to, a conjugated diene monomer unit, an alkylene structural unit, a nitrile group-containing monomer unit, a (meth)acrylic acid ester monomer unit, and an aromatic vinyl monomer unit.

—Conjugated Diene Monomer Unit—

Examples of conjugated diene monomers that may be used to form the conjugated diene monomer unit include conjugated diene compounds having a carbon number of 4 or more such as 1,3-butadiene, isoprene, 2,3-dimethyl-1,3-butadiene, and 1,3-pentadiene. Of these conjugated diene monomers, 1,3-butadiene is preferable.

—Alkylene Structural Unit—

The alkylene structural unit is a repeating unit composed only of an alkylene structure represented by a general formula: $-C_nH_{2n}-$ (n is an integer of 2 or more).

The alkylene structural unit may be linear or branched, and is preferably linear from a viewpoint of improving dispersion stability of a slurry composition for a non-aqueous secondary battery electrode. In other words, the alkylene structural unit is preferably a linear alkylene structural unit. The carbon number of the alkylene structural unit is preferably 4 or more (i.e., n in the preceding general formula is preferably an integer of 4 or more) from a viewpoint of further improving dispersion stability of a slurry composition for a non-aqueous secondary battery electrode.

No specific limitations are placed on the method by which the alkylene structural unit is introduced into the polymer (A). For example, a method described below in (1) or (2) may be used.

(1) A method in which a copolymer is produced from a monomer composition containing a conjugated diene monomer, and the resultant copolymer is hydrogenated to convert the conjugated diene monomer unit to an alkylene structural unit (2) A method in which a copolymer is produced from a monomer composition containing a 1-olefin monomer Of these methods, the method described in (1) is preferable in terms of ease of production of the polymer (A).

Note that the conjugated diene monomer used in the method described in (1) may be a conjugated diene compound having a carbon number of 4 or more such as 1,3-butadiene, isoprene, 2,3-dimethyl-1,3-butadiene, or 1,3-pentadiene, and of these compounds, is preferably 1,3-butadiene. In other words, the alkylene structural unit is preferably a structural unit obtained through hydrogenation of a conjugated diene monomer unit (i.e., a hydrogenated conjugated diene unit), and is more preferably a structural unit obtained through hydrogenation of a 1,3-butadiene unit (i.e., a hydrogenated 1,3-butadiene unit). Selective hydrogenation of the conjugated diene monomer unit can be carried out by a commonly known method such as an oil-layer hydrogenation method or a water-layer hydrogenation method.

Moreover, the 1-olefin monomer used in the method described above in (2) may, for example, be ethylene, propylene, 1-butene, 1-hexene, or the like.

One of these conjugated diene monomers or 1-olefin monomers may be used individually, or two or more of these monomers may be used in combination.

—Nitrile Group-Containing Monomer Unit—

Examples of nitrile group-containing monomers that may be used to form the nitrile group-containing monomer unit include α,β-ethylenically unsaturated nitrile monomers. Specifically, the α,β-ethylenically unsaturated nitrile monomer may be any α,β-ethylenically unsaturated compound that includes a nitrile group without any specific limitations and examples thereof include acrylonitrile; α-halogenoacrylonitriles such as α-chloroacrylonitrile and α-bromoacrylonitrile; and α-alkylacrylonitriles such as methacrylonitrile and α-ethylacrylonitrile. Of these examples, acrylonitrile and methacrylonitrile are preferable, and acrylonitrile is more preferable as a nitrile group-containing monomer.

One of these nitrile group-containing monomers may be used individually, or two or more of these nitrile group-containing monomers may be used in combination.

—(Meth)Acrylic Acid Ester Monomer Unit—

Examples of (meth)acrylic acid ester monomers that may be used to form the (meth)acrylic acid ester monomer unit include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. Of these (meth)acrylic acid ester monomers, methyl acrylate, ethyl acrylate, n-butyl acrylate, 2-ethylhexyl acrylate, methyl methacrylate, ethyl methacrylate, n-butyl methacrylate, and 2-ethylhexyl methacrylate are preferable, and n-butyl acrylate, ethyl methacrylate, and 2-ethylhexyl acrylate are more preferable.

One of these (meth)acrylic acid ester monomers may be used individually, or two or more of these (meth)acrylic acid ester monomers may be used in combination.

—Aromatic Vinyl Monomer Unit—

Examples of aromatic vinyl monomers that may be used to form the aromatic vinyl monomer unit include styrene, α-methylstyrene, butoxystyrene, and vinylnaphthalene. Of these aromatic vinyl monomers, styrene is preferable.

One of these aromatic vinyl monomers may be used individually, or two or more of these aromatic vinyl monomers may be used in combination.

The proportion in which repeating units other than the bondable functional group-containing monomer unit are included in the polymer (A) is preferably 80 mass % or more, more preferably 90 mass % or more, and even more preferably 95 mass % or more, and is preferably 99.9 mass % or less, more preferably 99.8 mass % or less, and even more preferably 99.5 mass % or less.

[[Production Method of Polymer (A)]]

No specific limitations are placed on the method by which the polymer (A) set forth above is produced. For example, the polymer (A) may be produced by polymerizing a monomer composition containing the monomers set forth above to obtain a copolymer, and then performing hydrogenation of the obtained copolymer as necessary.

The percentage content of each monomer in the monomer composition used in production of the polymer (A) can be set in accordance with the percentage content of each repeating unit in the polymer (A).

No specific limitations are placed on the mode of polymerization, and any of solution polymerization, suspension polymerization, bulk polymerization, emulsion polymerization, and the like may be used. Also, any polymerization reaction can be used, such as ionic polymerization, radical polymerization, or living radical polymerization.

Moreover, the method of hydrogenation of the copolymer is not specifically limited and may be a typical method using a catalyst (for example, refer to WO 2012/165120 A1, WO 2013/080989 A1, and JP 2013-8485 A).

<Organic Compound Including at Least Two Cationic Groups>

No specific limitations are placed on the polyvalent cationic organic compound (B) other than being an organic compound that includes a plurality of cationic groups in individual molecules thereof. Examples of the cationic groups include nitrogen-containing functional groups (excluding amide groups) such as a substituted or unsubstituted amino group ($-NH_2$, $-NHR^1$, $-NR^1R^2$, or $-N^+R^1R^2R^3$, where $R^1$ to $R^3$ represent any substituent), an imino group ($=NH$), and an oxazoline group. Of these cationic groups, a primary amino group (unsubstituted amino group, $-NH_2$), a secondary amino group ($-NHR^1$), or an imino group is preferable, and a primary amino group is more preferable from a viewpoint of causing favorable interaction of the polyvalent cationic organic compound (B) with the polymer (A), and further improving electrolyte solution resistance of an electrode mixed material layer and high-temperature storage characteristics of a secondary battery while ensuring viscosity stability of the binder composition. The polyvalent cationic organic compound (B) may include one type of cationic group or may include two or more types of cationic groups. Moreover, the polyvalent cationic organic compound (B) may be a polymer or a non-polymer.

In the present disclosure, a polymer that is an organic compound including at least two cationic groups is considered to be the polyvalent cationic organic compound (B) and not the polymer (A) even in a case in which the polymer also includes a functional group that is bondable with a cationic group.

[Examples of Polyvalent Cationic Organic Compound (B)]

The polyvalent cationic organic compound (B) is, for example, preferably an organic compound including at least two substituted or unsubstituted amino groups (hereinafter, also referred to simply as an "amino group-containing compound").

Examples of amino group-containing compounds that are non-polymers include ethylenediamine, 1,4-diaminobutane, triethylenetetramine, phenyldiamine, 4,4'-diaminodiphenyl ether, N,N'-bis(3-phenyl-2-propenylidene)-1,6-hexanediamine, and bisanilines.

Examples of amino group-containing compounds that are polymers include polyethyleneimine; polyethyleneimine derivatives such as poly(N-hydroxylethyleneimine) and carboxymethylated polyethyleneimine sodium salt; polypropyleneimine; polypropyleneimine derivatives such as poly(N-2-dihydroxylpropyleneimine); poly(allylamine); poly(allylamine) derivatives such as poly(dimethyldiallylammonium halide); aminoethylated acrylic polymers obtained through aminoethylation of acrylic acid polymers; and cationized cellulose obtained through modification of a cellulose derivative (for example, hydroxyethyl cellulose or carboxymethyl cellulose) with a cationizing agent including a substituted or unsubstituted amino group.

Of these amino group-containing compounds, polyethyleneimine and polyethyleneimine derivatives are preferable, and polyethyleneimine is more preferable in terms that this enables strong crosslinking since the number of amino groups per unit volume is large and can further improve electrolyte solution resistance of an electrode mixed material layer.

[Properties of Polyvalent Cationic Organic Compound (B)]

The molecular weight of the polyvalent cationic organic compound (B) ("weight average molecular weight" in a case in which the polyvalent cationic organic compound (B) is a polymer) is preferably 300 or more, more preferably 600 or more, even more preferably 1,000 or more, and particularly preferably 1,200 or more, and is preferably 400,000 or less, more preferably 100,000 or less, even more preferably 70,000 or less, and particularly preferably 10,000 or less. When the polyvalent cationic organic compound (B) has a molecular weight that is not more than any of the upper limits set forth above, the polyvalent cationic organic compound (B) is favorably dispersed in solvent, which enables formation of an even more rigid network with the polymer (A) in an obtained electrode mixed material layer. Consequently, electrolyte solution resistance of the electrode mixed material layer and secondary battery high-temperature storage characteristics can be further improved. Moreover, when the polyvalent cationic organic compound (B) has a molecular weight that is at least any of the lower limits set forth above, reactivity with the polymer (A) can be ensured and the polyvalent cationic organic compound (B) can favorably interact with the polymer (A) in solvent. Therefore, viscosity stability of the binder composition can be ensured. In addition, an even more rigid network can be formed with the polymer (A) in an electrode mixed material layer, and electrolyte solution resistance of the electrode mixed material layer and secondary battery high-temperature storage characteristics can be further improved.

In a case in which the polyvalent cationic organic compound (B) is a polymer in the present disclosure, the weight average molecular weight of the polymer can be determined as a polystyrene equivalent weight average molecular weight measured by gel permeation chromatography (developing solvent: tetrahydrofuran).

The amine value of the polyvalent cationic organic compound (B) is preferably 1 mmol/g or more, more preferably 2.5 mmol/g or more, and even more preferably 5 mmol/g or more, and is preferably 30 mmol/g or less, and more preferably 25 mmol/g or less. When the amine value of the polyvalent cationic organic compound (B) is not more than any of the upper limits set forth above, a sufficient rate of crosslinking reaction with the polymer (A) can be ensured, and a rigid network can be efficiently formed in an electrode mixed material layer. Moreover, when the amine value of the polyvalent cationic organic compound (B) is at least any of the lower limits set forth above, crosslinking with the polymer (A) can favorably proceed, and an even more rigid network can be formed with the polymer (A) in an electrode mixed material layer. Consequently, electrolyte solution resistance of the electrode mixed material layer and secondary battery high-temperature storage characteristics can be further improved.

The amine value of the polyvalent cationic organic compound (B) referred to herein is a value that expresses the number of millimoles of potassium hydroxide equivalent to the perchloric acid required to neutralize all basic nitrogen contained in 1 g of the polyvalent cationic organic compound (B). The amine value is determined as an amount per 1 g of solid content of the polyvalent cationic organic compound (B) by converting a mg KOH/g value obtained in accordance with the potentiometric titration method described in JIS K7237(1995) to mmol/g.

[Amount of Polyvalent Cationic Organic Compound (B)]

The amount of the polyvalent cationic organic compound (B) that is compounded per 100 parts by mass of the polymer (A) is preferably 0.1 parts by mass or more, more preferably 0.5 parts by mass or more, even more preferably 1 part by mass or more, and particularly preferably 2 parts by mass or more, and is preferably 20 parts by mass or less, more preferably 15 parts by mass or less, and even more preferably 8 parts by mass or less. If the amount of the polyvalent cationic organic compound (B) becomes excessive, there are cases in which the viscosity stability of the binder composition actually decreases, and unreacted residue acts as a plasticizer to cause loss of electrode peel strength. However, when the amount of the polyvalent cationic organic compound (B) is not more than any of the upper limits set forth above, reduction of electrode peel strength can be inhibited while ensuring viscosity stability of the binder composition. Moreover, when the amount of the polyvalent cationic organic compound (B) is at least any of the lower limits set forth above, the polymer (A) and the polyvalent cationic organic compound (B) can form an even more rigid network in an electrode mixed material layer. Consequently, electrolyte solution resistance of the electrode mixed material layer and secondary battery high-temperature storage characteristics can be further improved.

<Solvent>

The solvent of the binder composition for a non-aqueous secondary battery electrode is preferably an organic solvent. Examples of organic solvents that may be used include, but are not specifically limited to, alcohols such as methanol, ethanol, n-propanol, isopropanol, n-butanol, isobutanol, t-butanol, pentanol, hexanol, heptanol, octanol, nonanol, decanol, and amyl alcohol; ketones such as acetone, methyl ethyl ketone, and cyclohexanone; esters such as ethyl acetate and butyl acetate; ethers such as diethyl ether, dioxane, and tetrahydrofuran; amide polar organic solvents such as N,N-dimethylformamide and N-methylpyrrolidone (NMP); and aromatic hydrocarbons such as toluene, xylene, chlorobenzene, ortho-dichlorobenzene, and para-dichlorobenzene. One of these solvents may be used individually, or two or more of these solvents may be used as a mixture.

Of these solvents, a polar organic solvent is preferable, and NMP is more preferable.

<Other Components>

Besides the components set forth above, the presently disclosed binder composition for a non-aqueous secondary battery electrode may further contain components such as a binder other than the polymer (A) (for example, polyvinylidene fluoride, polyacrylonitrile, or polyacrylate), a reinforcing material, a leveling agent, a viscosity modifier, and an additive for electrolyte solution. These other components are not specifically limited so long as they do not affect the battery reactions and may be selected from commonly known components such as those described in WO 2012/115096 A1. One of such components may be used individually, or two or more of such components may be used in combination in a freely selected ratio.

(Slurry Composition for Non-Aqueous Secondary Battery Electrode)

A presently disclosed slurry composition for a non-aqueous secondary battery electrode contains an electrode active material and the binder composition set forth above, and may optionally further contain a conductive material and other components. In other words, the presently disclosed slurry composition contains an electrode active material, the polymer (A) set forth above, the polyvalent cationic organic compound (B) set forth above, and a solvent, and may optionally further contain a conductive material and other components. As a result of the presently disclosed slurry composition containing the binder composition set forth above, an electrode mixed material layer formed using the presently disclosed slurry composition has excellent electrolyte solution resistance and can cause a secondary battery to display excellent high-temperature storage characteristics.

<Electrode Active Material>

The electrode active material is a material that accepts and donates electrons in an electrode of a non-aqueous secondary battery. For example, in a case in which the non-aqueous secondary battery is a lithium ion secondary battery, the electrode active material is normally a material that can occlude and release lithium.

Although the following describes, as one example, a case in which the slurry composition for a non-aqueous secondary battery electrode is a slurry composition for a lithium ion secondary battery electrode, the presently disclosed slurry composition for a non-aqueous secondary battery electrode is not limited to the following example.

Examples of positive electrode active materials for lithium ion secondary batteries include, but are not specifically limited to, known positive electrode active materials such as lithium-containing cobalt oxide ($LiCoO_2$), lithium manganate ($LiMn_2O_4$), lithium-containing nickel oxide ($LiNiO_2$), lithium-containing composite oxide of Co—Ni—Mn ($Li(Co\ Mn\ Ni)O_2$), lithium-containing composite oxide of Ni—Mn—Al, lithium-containing composite oxide of Ni—Co—Al, olivine-type lithium iron phosphate ($LiFePO_4$), olivine-type manganese lithium phosphate ($LiMnPO_4$), $Li_2MnO_3$—$LiNiO_2$-based solid solution, lithium-rich spinel compounds represented by $Li_{1+x}Mn_{2-x}O_4$ (0<x<2), $Li[Ni_{0.17}Li_{0.2}CO_{0.07}Mn_{0.56}]O_2$, and $LiNi_{0.5}Mn_{1.5}O_4$.

The compounded amount and particle diameter of the positive electrode active material are not specifically limited and may be the same as those of a conventionally used positive electrode active material.

Examples of negative electrode active materials for lithium ion secondary batteries include a carbon-based negative electrode active material, a metal-based negative electrode active material, and a negative electrode active material formed by combining these materials.

The carbon-based negative electrode active material can be defined as an active material that contains carbon as its main framework and into which lithium can be inserted (also referred to as "doping"). Examples of the carbon-based negative electrode active material include carbonaceous materials and graphitic materials.

Examples of carbonaceous materials include graphitizing carbon and non-graphitizing carbon typified by glassy carbon that has a structure similar to an amorphous structure.

The graphitizing carbon may be a carbon material made using tar pitch obtained from petroleum or coal as a raw material. Specific examples of graphitizing carbon include coke, mesocarbon microbeads (MCMB), mesophase pitch-based carbon fiber, and pyrolytic vapor-grown carbon fiber.

Examples of the non-graphitizing carbon include pyrolyzed phenolic resin, polyacrylonitrile-based carbon fiber, quasi-isotropic carbon, pyrolyzed furfuryl alcohol resin (PFA), and hard carbon.

Examples of graphitic materials include natural graphite and artificial graphite.

Examples of the artificial graphite include artificial graphite obtained by heat-treating carbon containing graphitizing carbon mainly at 2800° C. or higher, graphitized MCMB obtained by heat-treating MCMB at 2000° C. or higher, and graphitized mesophase pitch-based carbon fiber obtained by heat-treating mesophase pitch-based carbon fiber at 2000° C. or higher.

The metal-based negative electrode active material is an active material that contains metal, the structure of which usually contains an element that allows insertion of lithium, and that exhibits a theoretical electric capacity per unit mass of 500 mAh/g or more when lithium is inserted. Examples of the metal-based active material include lithium metal; a simple substance of metal that can form a lithium alloy (for example, Ag, Al, Ba, Bi, Cu, Ga, Ge, In, Ni, P, Pb, Sb, Si, Sn, Sr, Zn, or Ti); alloys of the simple substance of metal; and oxides, sulfides, nitrides, silicides, carbides, and phosphides of lithium metal, the simple substance of metal, and the alloys of the simple substance of metal. Of these metal-based negative electrode active materials, active materials containing silicon (silicon-based negative electrode active materials) are preferred. One reason for this is that the capacity of a lithium ion secondary battery can be increased though use of a silicon-based negative electrode active material.

Examples of the silicon-based negative electrode active material include silicon (Si), a silicon-containing alloy, SiO, $SiO_x$, and a composite material of conductive carbon and a Si-containing material obtained by coating or combining the Si-containing material with the conductive carbon. One of these silicon-based negative electrode active materials may be used individually, or two or more of these silicon-based negative electrode active materials may be used in combination.

The compounded amount and particle diameter of the negative electrode active material are not specifically limited and may be the same as those of a conventionally used negative electrode active material.

<Binder Composition for Non-Aqueous Secondary Battery Electrode>

The binder composition for a non-aqueous secondary battery electrode that is used is a binder composition for a non-aqueous secondary battery electrode containing the polymer (A) and the polyvalent cationic organic compound (B) set forth above.

The content of the binder composition in the slurry composition for a non-aqueous secondary battery electrode is set such that the amount of the polymer (A) per 100 parts by mass of the electrode active material is preferably 0.1 parts by mass or more, and more preferably 0.3 parts by mass or more, and is preferably 3 parts by mass or less, and more preferably 1.5 parts by mass or less. When the binder composition is contained in the slurry composition in an amount such that the amount of the polymer (A) is within any of the ranges set forth above, electrolyte solution resistance of an electrode mixed material layer and high-temperature storage characteristics of a secondary battery can be further improved.

<Conductive Material>

The conductive material ensures electrical contact among the electrode active material. Examples of conductive materials that may be used include conductive carbon materials such as carbon black (for example, acetylene black, Ketjenblack® (Ketjenblack is a registered trademark in Japan, other countries, or both), and furnace black), single-walled and multi-walled carbon nanotubes (multi-walled carbon nanotubes are inclusive of cup-stacked carbon nanotubes), carbon nanohorns, vapor-grown carbon fiber, milled carbon fiber obtained through pyrolysis and subsequent pulverization of polymer fiber, single-layer and multi-layer graphene, and carbon nonwoven fabric sheet obtained through pyrolysis of nonwoven fabric made from polymer fiber; and fibers and foils of various metals.

One of these conductive materials may be used individually, or two or more of these conductive materials may be used in combination.

The content of the conductive material in the slurry composition for a non-aqueous secondary battery electrode per 100 parts by mass of the electrode active material is preferably 0.1 parts by mass or more, and more preferably 0.5 parts by mass or more, and is preferably 5 parts by mass or less, and more preferably 3 parts by mass or less. When the amount of the conductive material is within any of the ranges set forth above, sufficient electrical contact among the electrode active material can be ensured, and a secondary battery can be caused to display excellent battery characteristics (for example, output characteristics).

<Other Components>

Examples of other components that may be compounded in the slurry composition include, but are not specifically limited to, the same other components that may be compounded in the binder composition set forth above. One of such other components may be used individually, or two or more of such other components may be used in combination in a freely selected ratio.

<Production of Slurry Composition>

The slurry composition set forth above can be produced by dissolving or dispersing the above-described components in a solvent, such as an organic solvent. Specifically, the slurry composition can be produced by mixing the above-described components and the solvent using a mixer such as a ball mill, a sand mill, a bead mill, a pigment disperser, a grinding machine, an ultrasonic disperser, a homogenizer, a planetary mixer, or a FILMIX. Note that solvent contained in the binder composition may be used as the solvent used in production of the slurry composition.

The above-described components may be mixed in the solvent in any order without any specific limitations. Specifically, the components may, for example, be mixed in the order described below in any of (1) to (3) in production of the slurry composition.

(1) The components are all mixed at once.

(2) The binder composition containing the polymer (A) and the polyvalent cationic organic compound (B) is mixed with the conductive material to obtain a conductive material paste composition for a non-aqueous secondary battery electrode, and then the electrode active material is added to and mixed with the conductive material paste composition for a non-aqueous secondary battery electrode.

(3) The conductive material and the electrode active material are mixed, and then the binder composition containing the polymer (A) and the polyvalent cationic organic compound (B) is added to and mixed with the resultant mixture.

Of these mixing orders, it is preferable that the components are mixed in the order described in (1) or (2). In a situation in which the order described in (2) is adopted, and thus the binder composition and the conductive material are premixed to obtain a conductive material paste composition for a non-aqueous secondary battery electrode containing the conductive material and the binder composition set forth above (i.e., containing the conductive material, the polymer (A), the polyvalent cationic organic compound (B), and the solvent), the polymer (A) is adsorbed onto the surface of the conductive material to enable favorable dispersion of the conductive material. As a result, a secondary battery can be caused to display excellent battery characteristics (for example, output characteristics).

(Electrode for Non-Aqueous Secondary Battery)

A presently disclosed electrode for a secondary battery includes a current collector and an electrode mixed material layer formed on the current collector, wherein the electrode mixed material layer is formed using the slurry composition for a non-aqueous secondary battery electrode set forth above. In other words, the electrode mixed material layer contains at least an electrode active material, the polymer (A), and the polyvalent cationic organic compound (B). The polymer (A) and the polyvalent cationic organic compound (B) may form a crosslinked structure. In other words, the electrode mixed material layer may contain a crosslinked product of the polymer (A) and the polyvalent cationic organic compound (B). It should be noted that components contained in the electrode mixed material layer are components that are contained in the previously described slurry composition for a non-aqueous secondary battery electrode. Furthermore, the preferred ratio of these components in the electrode mixed material layer is the same as the preferred ratio of these components in the slurry composition.

As a result of a slurry composition containing the presently disclosed binder composition for a non-aqueous secondary battery electrode being used in the presently disclosed electrode for a non-aqueous secondary battery, a rigid electrode mixed material layer in which the polymer (A) and the polyvalent cationic organic compound (B) strongly interact can be formed on the current collector. Consequently, when this electrode is used, elution of the electrode mixed material layer into electrolyte solution is inhibited, and a secondary battery having excellent battery characteristics such as high-temperature storage characteristics is obtained.

<Production Method of Electrode>

The presently disclosed electrode for a non-aqueous secondary battery may be produced, for example, through a step of applying the slurry composition set forth above onto the current collector (application step) and a step of drying the slurry composition that has been applied onto the current collector to form the electrode mixed material layer on the current collector (drying step).

[Application Step]

The slurry composition may be applied onto the current collector by any commonly known method without any specific limitations. Specific examples of application methods that can be used include doctor blading, dip coating, reverse roll coating, direct roll coating, gravure coating, extrusion coating, and brush coating. The slurry composition may be applied onto one side or both sides of the current collector. The thickness of the slurry coating on the current collector after application but before drying may be set as appropriate in accordance with the thickness of the electrode mixed material layer to be obtained after drying.

The current collector onto which the slurry composition is applied is a material having electrical conductivity and electrochemical durability. Specifically, the current collector may be made of, for example, iron, copper, aluminum, nickel, stainless steel, titanium, tantalum, gold, or platinum. One of the aforementioned materials may be used individually, or two or more of the aforementioned materials may be used in combination in a freely selected ratio.

[Drying Step]

The slurry composition that has been applied onto the current collector may be dried by any commonly known method without any specific limitations. Examples of drying methods that can be used include drying by warm, hot, or low-humidity air; drying in a vacuum; and drying by irradiation with infrared light, an electron beam, or the like. Through drying of the slurry composition on the current collector as described above, an electrode active material layer can be formed on the current collector to thereby provide an electrode for a secondary battery that includes the current collector and the electrode mixed material layer. The drying temperature is preferably at least 60° C. and not higher than 200° C., and more preferably at least 90° C. and not higher than 150° C.

In a case in which, for example, a polymer including a carboxylic acid group, a sulfonate group, and/or a phosphate group is used as the polymer (A) and an amino group-containing compound is used as the polyvalent cationic organic compound (B), the polymer (A) and the polyvalent cationic organic compound (B) are crosslinked by amide bonds, which can even further improve electrolyte solution resistance of the electrode mixed material layer, and further improve secondary battery high-temperature storage characteristics.

After the drying step, the electrode mixed material layer may be further subjected to a pressing process, such as mold pressing or roll pressing. The pressing process can improve close adherence between the electrode mixed material layer and the current collector. Furthermore, in a situation in which the electrode mixed material layer contains a curable polymer, the polymer is preferably cured after formation of the electrode mixed material layer.

(Non-Aqueous Secondary Battery)

A presently disclosed non-aqueous secondary battery includes a positive electrode, a negative electrode, an electrolyte solution, and a separator, wherein at least one of the positive electrode and the negative electrode is the presently disclosed electrode for a secondary battery. The presently disclosed non-aqueous secondary battery has excellent battery characteristics such as high-temperature storage characteristics as a result of including the presently disclosed electrode for a non-aqueous secondary battery.

Although the following describes, as one example, a case in which the non-aqueous secondary battery is a lithium ion secondary battery, the presently disclosed non-aqueous secondary battery is not limited to the following example.

<Electrodes>

Electrodes other than the electrode for a non-aqueous secondary battery set forth above that may be used in the presently disclosed non-aqueous secondary battery are not specifically limited and any known electrode that is used in secondary battery production may be used. Specifically, an electrode obtained by forming an electrode mixed material layer on a current collector by a known production method may be used as an electrode other than the electrode for a non-aqueous secondary battery set forth above.

<Electrolyte Solution>

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that may be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable and $LiPF_6$ is particularly preferable as these lithium salts readily dissolve in a solvent and exhibit a high degree of dissociation. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Suitable examples of organic solvents that may be used include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixed liquid of such solvents may be used. Of these solvents, carbonates are preferable due to having high permittivity and a wide stable potential region.

Note that the concentration of the electrolyte in the electrolyte solution may be adjusted as appropriate. Furthermore, known additives may be added to the electrolyte solution.

<Separator>

Examples of separators that can be used include, but are not specifically limited to, those described in JP 2012-204303 A. Of these separators, a microporous membrane made of polyolefinic (polyethylene, polypropylene, polybutene, or polyvinyl chloride) resin is preferred because such a membrane can reduce the total thickness of the separator, which increases the ratio of electrode active material in the secondary battery, and consequently increases the capacity per volume.

<Production Method of Secondary Battery>

The presently disclosed secondary battery may be produced by, for example, stacking the positive electrode and the negative electrode with the separator in-between, performing rolling, folding, or the like of these battery members as necessary in accordance with the battery shape to place them in a battery container, injecting the electrolyte solution into the battery container, and sealing the battery container. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%", "ppm", and "parts" used in expressing quantities are by mass, unless otherwise specified.

Moreover, in the case of a polymer that is produced through copolymerization of more than one monomer, the proportion of the polymer constituted by a monomer unit formed through polymerization of a given monomer is normally, unless otherwise specified, the same as the ratio (charging ratio) of the given monomer among all monomers used in polymerization of the polymer.

The following methods were used in the examples and comparative examples to evaluate the viscosity stability of a binder composition, the electrolyte solution resistance of an electrode mixed material layer, and the high-temperature storage characteristics of a secondary battery.

<Viscosity Stability>

The viscosity M0 of a binder composition straight after production thereof and the viscosity M1 of the binder composition after storage for 7 days at 60° C. were measured. Viscosity measurement was carried out using a B-type viscometer under conditions of a temperature of 25° C., a No. 4 rotor, and a rotor rotation speed of 60 rpm.

The rate of viscosity change ΔM (=M1/M0×100(%)) was calculated, and was evaluated by the following standard. A smaller value for the rate of viscosity change ΔM indicates that the binder composition has high viscosity stability.

A: Rate of viscosity change ΔM of less than 110%
B: Rate of viscosity change ΔM of at least 110% and less than 120%
C: Rate of viscosity change ΔM of at least 120% and less than 130%
D: Rate of viscosity change ΔM of 130% or more <Electrolyte Solution Resistance>

A binder composition was dried for 12 hours at 120° C. in a Teflon® (Teflon is a registered trademark in Japan, other countries, or both) petri dish to obtain a film of 1 mm in thickness. This film was punched out as a circular shape of 1.6 mm in diameter to obtain a measurement sample (simulated electrode mixed material layer), and the weight W0 of the sample was measured.

The obtained measurement sample was stored in a 60° C. electrolyte solution for 144 hours and was subsequently washed with methanol. The weight W1 of the washed measurement sample was measured.

The electrolyte solution was an electrolyte solution obtained by dissolving $LiPF_6$ with a concentration of 1 mol/L in a mixed solvent in which ethylene carbonate (EC), propylene carbonate (PC), ethyl methyl carbonate (EMC), and propyl propionate (PP) were mixed in a mass ratio of EC:PC:EMC:PP=2:1:1:6, and further adding 1.5 volume % of vinylene carbonate as an additive.

The non-eluted fraction ΔW (=W1/W0×100(%)) was calculated, and was evaluated by the following standard. A larger value for the non-eluted fraction ΔW indicates that an electrode mixed material layer obtained using the binder composition has high electrolyte solution resistance.

A: Non-eluted fraction ΔW of 85% or more
B: Non-eluted fraction ΔW of at least 70% and less than 85%
C: Non-eluted fraction ΔW of at least 55% and less than 70%
D: Non-eluted fraction ΔW of at least 40% and less than 55%
E: Non-eluted fraction ΔW of less than 40%

<High-Temperature Storage Characteristics>

A produced secondary battery was constant-current charged to a battery voltage of 4.4 V at 0.2 CmA and an ambient temperature of 25° C., and was then constant-voltage charged at 4.4 V until the charging current reached 0.02 CmA. Next, the secondary battery was constant-current discharged to a battery voltage of 3.0 V at 0.2 CmA. The capacity at the end of constant-current discharge was taken to be the initial capacity. Thereafter, the secondary battery was charged to a cell voltage of 3.82 V by a 0.2 CmA constant-current method at 25° C., was left in this charged state for 5 hours, and then the voltage Vini0 was measured. An operation of discharging at 3 C was further performed, and the voltage Vini20 20 seconds after the start of discharging was measured. The resistance before high-temperature storage was defined by a change in voltage expressed by ΔVini=Vini0−Vini20.

After this measurement, the secondary battery was constant-current charged to a battery voltage of 4.4 V at 0.2 CmA. The secondary battery was then stored for 20 days in a 60° C. thermostatic tank. Thereafter, the secondary battery was constant-current discharged to a battery voltage of 3.0 V at 0.2 CmA and an ambient temperature of 25° C.

Next, the secondary battery was charged to a cell voltage of 3.82 V by a 0.1 C constant-current method at 25° C., was left in this charged state for 5 hours, and then the voltage Vfin0 was measured. An operation of discharging at 3 C was further performed, and the voltage Vfin20 20 seconds after the start of discharging was measured. The resistance after high-temperature storage was defined by a change in voltage expressed by ΔVfin=Vfin0−Vfin20.

Moreover, a value calculated from ΔVfin/ΔVini×100(%) was taken to be the rate of resistance rise after high-temperature storage, and was evaluated by the following standard. A smaller value for the rate of resistance rise indicates excellent inhibition of a rise in resistance after high-temperature storage.

A: Rate of resistance rise of less than 120%
B: Rate of resistance rise of at least 120% and less than 130%
C: Rate of resistance rise of at least 130% and less than 140%
D: Rate of resistance rise of 140% or more Example 1

<Production of Polymer (A)>

A reaction vessel A equipped with a mechanical stirrer and a condenser was charged with 210 parts of deionized water and 0.5 parts (in terms of solid content) of alkyldiphenyloxide disulfonate of 30% in concentration (DOWFAX® 2A1 (DOWFAX is a registered trademark in Japan, other countries, or both) produced by The Dow Chemical Company) as an emulsifier under a nitrogen atmosphere. The mixture in the reaction vessel A was heated to 70° C. under stirring, and then 25.5 parts of 1.96% potassium persulfate aqueous solution was further added to the reaction vessel A to obtain a mixed liquid A. Next, a separate vessel B equipped with a mechanical stirrer was charged with 1 part of methacrylic acid as a bondable functional group-containing monomer, 20 parts of n-butyl acrylate and 79 parts of ethyl methacrylate as (meth)acrylic acid ester monomers, 0.5 parts (in terms of solid content) of alkyldiphenyloxide disulfonate of 30% in concentration (DOWFAX® 2A1 produced by The Dow Chemical Company) as an emulsifier, and 22.7 parts of deionized water under a nitrogen atmosphere, and these materials were stirred and emulsified to produce a monomer mixed liquid B. The monomer mixed liquid B, in a stirred and emulsified state, was added to the mixed liquid A in the reaction vessel A, and polymerization was carried out. Note that addition of the monomer mixed liquid B was performed at a constant rate over 2.5 hours. The reaction was continued until the polymerization conversion rate reached 95% to yield a water dispersion of a polymer. NMP was added as a solvent to the water dispersion of the polymer so as to adjust the solid content concentration of the polymer to 7%. Water and excess NMP were removed by vacuum distillation at 90° C. to yield an NMP solution of the polymer (A) (solid content concentration: 8%).

<Preparation of Polyvalent Cationic Organic Compound (B)>

Polyethyleneimine (produced by Nippon Shokubai Co., Ltd.; amine value: 21 mmol/g; weight average molecular weight: 1,200) was prepared as a polyvalent cationic organic compound (B). An NMP solution of the polyethyleneimine (solid content concentration: 8%) was produced.

<Production of Binder Composition for Positive Electrode>

A binder composition for a positive electrode was obtained by mixing the previously described NMP solution of the polymer (A) and NMP solution of polyethyleneimine in a solid content mixing ratio of 100:5. The binder composition for a positive electrode was used in evaluation of viscosity stability and electrolyte solution resistance. The results are shown in Table 1.

<Production of Slurry Composition for Positive Electrode>

A slurry composition for a positive electrode was produced by mixing 100 parts of lithium cobalt oxide (LiCoO$_2$; volume average particle diameter: 12 μm) as a positive electrode active material, 1.5 parts of Ketjenblack (produced by Lion Corporation; product name: Special Oil Furnace Carbon Powder; number average particle diameter: 40 nm; specific surface area: 800 m$^2$/g) as a conductive material, an amount of the binder composition for a positive electrode such that the amount of the polymer (A) was 0.6 parts (in terms of solid content), 0.6 parts (in terms of solid content) of an NMP solution of polyvinylidene fluoride (PVDF) as a binder, and NMP as supplemental solvent in a planetary mixer. The amount of supplemental NMP was adjusted such that the obtained slurry composition for a positive electrode had a viscosity (measured using B-type viscometer; temperature: 25° C.; rotor: No. 4; rotor rotation speed: 60 rpm) within a range of 5000±200 mPa·s.

<Production of Positive Electrode>

The obtained slurry composition for a positive electrode was applied onto one side of a current collector formed from aluminum foil of 15 μm in thickness such that the applied amount after drying was 20 mg/cm$^2$. The applied slurry composition was dried for 20 minutes at 90° C. and 20 minutes at 120° C., and then heat treatment was performed for 2 hours at 150° C. to obtain a positive electrode web. The obtained positive electrode web was rolled by roll pressing to obtain a positive electrode including a positive electrode mixed material layer of 3.7 g/cm$^3$ in density on the aluminum foil (current collector).

<Production of Negative Electrode>

A slurry composition for a negative electrode was produced by mixing 100 parts of spherical artificial graphite (volume average particle diameter: 12 μm) as a negative electrode active material, 1 part of a styrene-butadiene copolymer as a binder, 1 part of carboxymethyl cellulose as a thickener, and an appropriate amount of water as a dispersion medium in a planetary mixer.

The obtained slurry composition for a negative electrode was applied onto one side of a current collector formed from copper foil of 15 μm in thickness such that the applied amount after drying was 10 mg/cm$^2$. The applied slurry composition was dried for 20 minutes at 60° C. and 20 minutes at 120° C. to obtain a negative electrode web. The obtained negative electrode web was rolled by roll pressing to obtain a negative electrode including a negative electrode mixed material layer of 1.5 g/cm$^3$ in density on the copper foil (current collector).

<Preparation of Separator>

A single-layer separator made from polypropylene (width: 65 mm; length: 500 mm; thickness: 25 μm; produced by dry method; porosity: 55%) was cut out as a square shape of 4.4 cm×4.4 cm.

<Production of Secondary Battery>

An aluminum packing case was prepared as a battery case. The positive electrode obtained as described above was cut out as a square shape of 4 cm×4 cm and was positioned with the surface at the current collector-side thereof in contact with the aluminum packing case. The square separator obtained as described above was positioned on the positive electrode mixed material layer of the positive electrode. Moreover, the negative electrode obtained as described above was cut out as a square shape of 4.2 cm×4.2 cm and was positioned on the separator such that the surface at the negative electrode mixed material layer-side thereof faced toward the separator. The aluminum packing case was filled with electrolyte solution, and was subsequently closed by heat sealing at 150° C. to seal an opening of the aluminum packing case and thereby obtain a lithium ion secondary battery. The electrolyte solution was an electrolyte solution obtained by dissolving LiPF$_6$ with a concentration of 1 mol/L in a mixed solvent in which ethylene carbonate (EC), propylene carbonate (PC), ethyl methyl carbonate (EMC), and propyl propionate (PP) were mixed in a mass ratio of EC:PC:EMC:PP=2:1:1:6, and further adding 1.5 volume % of vinylene carbonate as an additive.

The obtained lithium ion secondary battery was used in evaluation of high-temperature storage characteristics. The results are shown in Table 1.

Examples 2 and 3

A polymer (A), a binder composition for a positive electrode, a slurry composition for a positive electrode, a positive electrode, a negative electrode, and a secondary battery were produced in the same way as in Example 1 with the exception that a monomer make-up shown in Table 1 was adopted in production of the polymer (A). Moreover, evaluations were carried out in the same way as in Example 1. The results are shown in Table 1.

Examples 4 and 5

A polymer (A), a binder composition for a positive electrode, a slurry composition for a positive electrode, a positive electrode, a negative electrode, and a secondary battery were produced in the same way as in Example 1 with the exception that the amount of the polyvalent cationic organic compound (B) was changed as shown in Table 1 in production of the binder composition for a positive electrode. Moreover, evaluations were carried out in the same way as in Example 1. The results are shown in Table 1.

Example 6

A polymer (A), a binder composition for a positive electrode, a slurry composition for a positive electrode, a positive electrode, a negative electrode, and a secondary battery were produced in the same way as in Example 1 with the exception that 2-acrylamido-2-methylpropanesulfonic acid was used instead of acrylic acid as a bondable functional group-containing monomer in production of the polymer (A). Moreover, evaluations were carried out in the same way as in Example 1. The results are shown in Table 1.

Examples 7 to 9

A polymer (A), a binder composition for a positive electrode, a slurry composition for a positive electrode, a positive electrode, a negative electrode, and a secondary battery were produced in the same way as in Example 1 with the exception that the following aminoethylated acrylic polymer X, aminoethylated acrylic polymer Y, or triethylenetetramine was used instead of polyethyleneimine as a polyvalent cationic organic compound (B) in production of the binder composition for a positive electrode. Moreover, evaluations were carried out in the same way as in Example 1. The results are shown in Table 1.

Aminoethylated acrylic polymer X: Produced by Nippon Shokubai Co., Ltd.; product name: POLYMENT® NK-200PM (POLYMENT is a registered trademark in Japan, other countries, or both); amine value: 2.5 mmol/g; weight average molecular weight: 20,000

Aminoethylated acrylic polymer Y: Produced by Nippon Shokubai Co., Ltd.; product name: POLYMENT® NK-350; amine value: 0.8 mmol/g; weight average molecular weight: 100,000

Triethylenetetramine: Amine value: 25 mmol/g; molecular weight: 146.23

Example 10

A binder composition for a positive electrode, a slurry composition for a positive electrode, a positive electrode, a negative electrode, and a secondary battery were produced in the same way as in Example 1 with the exception that a polymer (A) produced as described below was used. Moreover, evaluations were carried out in the same way as in Example 1. The results are shown in Table 1.
<Production of Polymer (A)>
A metal bottle was charged with 180 parts of deionized water, 25 parts of sodium dodecylbenzenesulfonate aqueous solution of 10 mass % in concentration, 1 part of methacrylic acid as a bondable functional group-containing monomer, 35 parts of acrylonitrile as a nitrile group-containing monomer, and 0.5 parts of t-dodecyl mercaptan as a molecular weight modifier in order. Gas inside the metal bottle was purged with nitrogen three times and then 64 parts of 1,3-butadiene was added as a conjugated diene monomer. The metal bottle was maintained at 5° C., 0.1 parts of cumene hydroperoxide was added as a polymerization initiator, and polymerization was carried out for 16 hours while rotating the metal bottle. Next, the polymerization reaction was terminated by adding 0.1 parts of hydroquinone aqueous solution of 10 mass % in concentration as a polymerization inhibitor, and residual monomer was subsequently removed using a rotary evaporator with a water temperature of 60° C. to obtain a water dispersion of a polymer (solid content concentration: approximately 30 mass %).

Next, the water dispersion produced as described above and palladium catalyst (solution of 1 mass % palladium acetate acetone solution and deionized water mixed 1:1 (mass ratio)) were added into an autoclave such that the palladium content was 750 ppm relative to the dry weight of the polymer contained in the obtained water dispersion. A hydrogenation reaction was carried out for 6 hours at a hydrogen pressure of 3 MPa and a temperature of 50° C. to yield a hydrogenated polymer.

Next, NMP was added as a solvent to the obtained water dispersion of the hydrogenated polymer such that the solid content concentration of the hydrogenated polymer was adjusted to 7%. Water and excess NMP were removed by vacuum distillation at 90° C. to yield an NMP solution (solid content concentration: 8%) of a polymer (A) (hydrogenated polymer).

Example 11

A binder composition for a positive electrode, a slurry composition for a positive electrode, a positive electrode, a negative electrode, and a secondary battery were produced in the same way as in Example 1 with the exception that a polymer (A) produced as described below was used. Moreover, evaluations were carried out in the same way as in Example 1. The results are shown in Table 1.
<Production of Polymer (A)>
An autoclave equipped with a stirrer was charged with 164 parts of deionized water, 1 part of methacrylic acid as a bondable functional group-containing monomer, 56 parts of 2-ethylhexyl acrylate as a (meth)acrylic acid ester monomer, 38 parts of styrene as an aromatic vinyl monomer, 5 parts of acrylonitrile as a nitrile group-containing monomer, 0.3 parts of potassium persulfate as a polymerization initiator, and 1.2 parts of polyoxyethylene alkyl ether sodium sulfate as an emulsifier. These materials were sufficiently stirred and were polymerized under heating for 3 hours at 80° C. and then for 2 hours at 80° C. to yield a water dispersion of a polymer. The polymerization conversion rate was calculated to be 96% from the solid content concentration. Next, NMP was added as a solvent to the obtained water dispersion of the polymer such that the solid content concentration of the polymer was adjusted to 7%. Water and excess NMP were removed by vacuum distillation at 90° C. to yield an NMP solution of the polymer (A) (solid content concentration: 8%).

Comparative Example 1

A polymer was produced in the same way as in Example 1 with the exception that a monomer make-up shown in Table 1 (bondable functional group-containing monomer not used) was adopted in production of the polymer (A). A binder composition for a positive electrode, a slurry composition for a positive electrode, a positive electrode, a negative electrode, and a secondary battery were produced in the same way as in Example 1 with the exception that this polymer was used instead of the polymer (A). Moreover, evaluations were carried out in the same way as in Example 1. The results are shown in Table 1.

Comparative Example 2

A polymer (A), a binder composition for a positive electrode, a slurry composition for a positive electrode, a positive electrode, a negative electrode, and a secondary battery were produced in the same way as in Example 1 with the exception that a polyvalent cationic organic compound (B) was not used in production of the binder composition for a positive electrode. Moreover, evaluations were carried out in the same way as in Example 1. The results are shown in Table 1.

Comparative Example 3

A polymer (A), a binder composition for a positive electrode, a slurry composition for a positive electrode, a positive electrode, a negative electrode, and a secondary battery were produced in the same way as in Example 1 with the exception that diethylamine (amine value: 13.6 mmol/g; molecular weight: 44) was used instead of the polyvalent cationic organic compound (B) in production of the binder composition for a positive electrode. Moreover, evaluations were carried out in the same way as in Example 1. The results are shown in Table 1.

Comparative Example 4

A polymer (A), a binder composition for a positive electrode, a slurry composition for a positive electrode, a positive electrode, a negative electrode, and a secondary battery were produced in the same way as in Example 1 with the exception that an aluminum chelate (produced by Kawaken Fine Chemicals Co., Ltd.; product name: Aluminum Chelate A(W); aluminum tris(acetylacetonate)) was used instead of the polyvalent cationic organic compound (B) in production of the binder composition for a positive electrode. Moreover, evaluations were carried out in the same way as in Example 1. The results are shown in Table 1.

In Table 1, shown below:
"COOH" indicates carboxylic acid group;
"$SO_3H$" indicates sulfonate group;
"MA" indicates methacrylic acid unit;
"AMPS" indicates 2-acrylamido-2-methylpropanesulfonic acid unit;
"EMA" indicates ethyl methacrylate unit;
"BA" indicates n-butyl acrylate unit;
"2-EHA" indicates 2-ethylhexyl acrylate unit;
"AN" indicates acrylonitrile unit;
"BD" indicates 1,3-butadiene unit or hydrogenated 1,3-butadiene unit;
"ST" indicates styrene unit;
"PEI" indicates polyethyleneimine;
"NK-200PM" indicates aminoethylated acrylic polymer X;
"NK-350" indicates aminoethylated acrylic polymer Y;
"TET" indicates triethylenetetramine;
"DEA" indicates diethylamine; and
"AL" indicates aluminum chelate.

| | | | | | Example 1 | Example 2 | Example 3 | Example 4 | Example 5 | Example 6 | Example 7 | Example 8 |
|---|---|---|---|---|---|---|---|---|---|---|---|---|
| Binder composition | Polymer | Bondable functional group | | | COOH | COOH | COOH | COOH | COOH | $SO_3H$ | COOH | COOH |
| | | Make-up | Bondable functional group-containing monomer unit | MA [mass %] | 1 | 0.2 | 5 | 1 | 1 | — | 1 | 1 |
| | | | | AMPS [mass %] | — | — | — | — | — | 1 | — | — |
| | | | Other repeating units | EMA [mass %] | 79 | 79.8 | 75 | 79 | 79 | 79 | 79 | 79 |
| | | | | BA [mass %] | 20 | 20 | 20 | 20 | 20 | 20 | 20 | 20 |
| | | | | 2-EHA [mass %] | — | — | — | — | — | — | — | — |
| | | | | AN [mass %] | — | — | — | — | — | — | — | — |
| | | | | BD [mass %] | — | — | — | — | — | — | — | — |
| | | | | ST [mass %] | — | — | — | — | — | — | — | — |
| | | Amount [parts by mass] | | | 100 | 100 | 100 | 100 | 100 | 100 | 100 | 100 |
| | Cationic organic compound | Type | | | PEI | PEI | PEI | PEI | PEI | PEI | NK-200PM | NK-350 |
| | | Amine value [mmol/g] | | | 21 | 21 | 21 | 21 | 21 | 21 | 2.5 | 0.8 |
| | | Molecular weight | | | 1200 | 1200 | 1200 | 1200 | 1200 | 1200 | 20000 | 100000 |
| | | Amount [parts by mass] | | | 5 | 5 | 5 | 1 | 10 | 5 | 5 | 5 |
| | Metal chelate | Type | | | — | — | — | — | — | — | — | — |
| | | Amount [parts by mass] | | | — | — | — | — | — | — | — | — |
| Evaluation | Viscosity stability | | | | A | A | B | A | B | A | A | A |
| | Electrolyte solution resistance | | | | A | B | A | B | A | B | C | C |
| | High-temperature storage characteristics | | | | A | B | A | B | B | B | C | C |

-continued

| | | | | Example 9 | Example 10 | Example 11 | Comparative Example 1 | Comparative Example 2 | Comparative Example 3 | Comparative Example 4 |
|---|---|---|---|---|---|---|---|---|---|---|
| Binder composition | Polymer | Bondable functional group | | COOH | COOH | COOH | — | COOH | COOH | COOH |
| | Make-up | Bondable functional group-containing monomer unit | MA [mass %] | 1 | 1 | 1 | — | 1 | 1 | 1 |
| | | | AMPS [mass %] | — | — | — | — | — | — | — |
| | | Other repeating units | EMA [mass %] | 79 | — | — | 80 | 79 | 79 | 79 |
| | | | BA [mass %] | 20 | — | — | 20 | 20 | 20 | 20 |
| | | | 2-EHA [mass %] | — | — | 56 | — | — | — | — |
| | | | AN [mass %] | — | 35 | 5 | — | — | — | — |
| | | | BD [mass %] | — | 64 | — | — | — | — | — |
| | | | ST [mass %] | — | — | 38 | — | — | — | — |
| | | Amount [parts by mass] | | 100 | 100 | 100 | 100 | 100 | 100 | 100 |
| | Cationic organic compound | Type | | TET | PEI | PEI | PEI | — | DEA | — |
| | | Amine value [mmol/g] | | 25 | 21 | 21 | 21 | — | 13.6 | — |
| | | Molecular weight | | 146.23 | 1200 | 1200 | 1200 | — | 44 | — |
| | | Amount [parts by mass] | | 5 | 5 | 5 | 5 | — | 5 | 5 |
| | Metal chelate | Type | | — | — | — | — | — | — | AL |
| | | Amount [parts by mass] | | — | — | — | — | — | — | 5 |
| Evaluation | Viscosity stability | | | B | A | A | A | A | A | D |
| | Electrolyte solution resistance | | | C | A | A | E | E | E | B |
| | High-temperature storage characteristics | | | C | A | A | D | D | D | D |

It can be seen from Table 1 that in Examples 1 to 11 in which a binder composition containing a polymer (A) and a polyvalent cationic organic compound (B) was used, the binder composition had excellent viscosity stability, a slurry composition capable of forming an electrode mixed material layer having excellent electrolyte solution resistance was obtained, and a secondary battery having excellent high-temperature storage characteristics could be produced.

Moreover, it can be seen from Table 1 that in Comparative Example 1 in which a binder composition containing a polymer that did not include a functional group that is bondable with a cationic group and a polyvalent cationic organic compound (B) was used, electrolyte solution resistance of the electrode mixed material layer decreased, and high-temperature storage characteristics of the secondary battery deteriorated. Furthermore, it can be seen from Table 1 that in Comparative Example 2 in which a binder composition containing a polymer (A) but not containing a polyvalent cationic organic compound (B) was used, electrolyte solution resistance of the electrode mixed material layer decreased, and high-temperature storage characteristics of the secondary battery deteriorated. It can also be seen from Table 1 that in Comparative Example 3 in which a binder composition containing a polymer (A) and diethylamine, which only includes one cationic group, was used, electrolyte solution resistance of the electrode mixed material layer decreased, and high-temperature storage characteristics of the secondary battery deteriorated. Moreover, it can be seen from Table 1 that in Comparative Example 4 in which a binder composition containing a polymer (A) and an aluminum chelate was used, viscosity stability of the binder composition decreased, and high-temperature storage characteristics of the secondary battery deteriorated. This reduction in performance is presumed to be caused by aluminum ions originating from the aluminum chelate. Specifically, the decrease in viscosity stability is presumed to be due to the aluminum ions causing crosslinking reaction with the polymer (A) and thickening of the polymer (A) as a result of having high mobility in solvent. Moreover, the deterioration of high-temperature storage characteristics is presumed to be due to an increase in temperature caused by shear in production of the slurry composition, which causes crosslinking reaction of aluminum ions with the polymer (A), and, as a result, loss of dispersibility of the conductive material since the polymer (A) does not readily coat the conductive material.

INDUSTRIAL APPLICABILITY

According to the present disclosure, it is possible to obtain a binder composition for a non-aqueous secondary battery electrode that has excellent viscosity stability and can form an electrode mixed material layer having excellent electrolyte solution resistance.

Moreover, according to the present disclosure, it is possible to obtain a conductive material paste composition for a non-aqueous secondary battery electrode and a slurry composition for a non-aqueous secondary battery electrode that can form an electrode mixed material layer having excellent electrolyte solution resistance and can cause a non-aqueous secondary battery to display excellent high-temperature storage characteristics.

Furthermore, according to the present disclosure, it is possible to obtain an electrode for a non-aqueous secondary battery that includes an electrode mixed material layer having excellent electrolyte solution resistance and can cause a non-aqueous secondary battery to display excellent high-temperature storage characteristics.

Also, according to the present disclosure, it is possible to obtain a non-aqueous secondary battery having excellent high-temperature storage characteristics.

The invention claimed is:
1. A binder composition for a non-aqueous secondary battery electrode comprising:

an organic compound including at least two cationic groups; and a polymer including a functional group that is bondable with one of the at least two cationic groups, wherein the polymer includes a monomer unit including the bondable functional group, a content of the monomer unit with respect to the polymer is 0.1 mass % to 20 mass %, and the amine value of the organic compound is 5 mmol/g or more and 21 mmol/g or less.

2. The binder composition for a non-aqueous secondary battery electrode according to claim 1, wherein the bondable functional group is at least one selected from the group consisting of a carboxylic acid group, a sulfonate group, a phosphate group, and a hydroxyl group.

3. The binder composition for a non-aqueous secondary battery electrode according to claim 1, comprising at least 0.1 parts by mass and not more than 20 parts by mass of the organic compound per 100 parts by mass of the polymer.

4. The binder composition for a non-aqueous secondary battery electrode according to claim 1, wherein at least one of the cationic groups of the organic compound is a substituted or unsubstituted amino group.

5. The binder composition for a non-aqueous secondary battery electrode according to claim 1, wherein the organic compound has a molecular weight of at least 300.

6. A conductive material paste composition for a non-aqueous secondary battery electrode comprising:

a conductive material; and the binder composition for a non-aqueous secondary battery electrode according to claim 1.

7. A slurry composition for a non-aqueous secondary battery electrode comprising:

an electrode active material; and the binder composition for a non-aqueous secondary battery electrode according to claim 1.

8. An electrode for a non-aqueous secondary battery comprising an electrode mixed material layer formed using the slurry composition for a non-aqueous secondary battery electrode according to claim 7.

9. A non-aqueous secondary battery comprising a positive electrode, a negative electrode, an electrolyte solution, and a separator, wherein at least one of the positive electrode and the negative electrode is the electrode for a non-aqueous secondary battery according to claim 8.

10. The binder composition for a non-aqueous secondary battery electrode according to claim 1, wherein the polymer includes a (meth)acrylic acid ester monomer unit, an aromatic vinyl monomer unit, and a nitrile group-containing monomer unit.

11. The binder composition for a non-aqueous secondary battery electrode according to claim 1, wherein the polymer includes 2-ethylhexyl acrylate unit, styrene unit, methacrylic acid unit, and acrylonitrile unit.

12. The binder composition for a non-aqueous secondary battery electrode according to claim 1, wherein the monomer unit including the bondable functional group is at least one selected from the group consisting of a carboxylic acid group-containing monomer unit, a sulfonate group-containing monomer unit, a phosphate group-containing monomer unit, and a hydroxyl group-containing monomer unit.

13. The binder composition for a non-aqueous secondary battery electrode according to claim 1, wherein the monomer unit including the bondable functional group is at least one selected from the group consisting of a carboxylic acid group-containing monomer unit, a sulfonate group-containing monomer unit, and a phosphate group-containing monomer unit.

14. The binder composition for a non-aqueous secondary battery electrode according to claim 1, wherein the monomer unit including the bondable functional group is a carboxylic acid group-containing monomer unit.

* * * * *